United States Patent
Gargiulo et al.

(10) Patent No.: US 12,448,693 B2
(45) Date of Patent: Oct. 21, 2025

(54) ANODE FOR ELECTROLYTIC EVOLUTION OF CHLORINE

(71) Applicant: INDUSTRIE DE NORA S.P.A., Milan (IT)

(72) Inventors: Alice Gargiulo, Milan (IT); Alice Calderara, Milan (IT); Luciano Iacopetti, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 956 days.

(21) Appl. No.: 16/973,245

(22) PCT Filed: Jun. 13, 2019

(86) PCT No.: PCT/EP2019/065538
§ 371 (c)(1),
(2) Date: Dec. 8, 2020

(87) PCT Pub. No.: WO2019/243163
PCT Pub. Date: Dec. 26, 2019

(65) Prior Publication Data
US 2021/0238757 A1    Aug. 5, 2021

(30) Foreign Application Priority Data

Jun. 21, 2018 (IT) .................. 102018000006544

(51) Int. Cl.
*C25B 11/081* (2021.01)
*C23C 18/02* (2006.01)
(Continued)

(52) U.S. Cl.
CPC ............ *C25B 11/081* (2021.01); *C23C 18/02* (2013.01); *C23C 18/1225* (2013.01); *C25B 1/26* (2013.01);
(Continued)

(58) Field of Classification Search
CPC ....... C25B 11/081; C25B 11/063; C25B 9/23; C25B 1/26; C25B 13/00; C23C 18/02; C23C 18/50; C23C 18/1225
(Continued)

(56) References Cited

U.S. PATENT DOCUMENTS 3,776,834 A * 12/1973 O'Leary ............... C25B 11/093
204/290.13
3,853,739 A * 12/1974 Kolb ..................... C25B 11/093
204/290.09

(Continued)

FOREIGN PATENT DOCUMENTS

| EP | 3175019 B1 | 11/2018 |
|---|---|---|
| JP | S6338592 A * | 2/1988 |
| WO | 2010055065 A1 | 5/2010 |

OTHER PUBLICATIONS

S. Chellammal, et al., "Anodic incineration of phthalic anhydride using Ru02-Ir02-Sn02-Ti02coated on Ti anode", Arabian Journal of Chemistry, vol. 9, pp. 1-10, 2012.

(Continued)

*Primary Examiner* — Brian K Talbot
(74) *Attorney, Agent, or Firm* — LUCAS & MERCANTI, LLP

(57) ABSTRACT

The invention relates to a process for obtaining a electrode usable as a anode in electrolytic cells for the production of chlorine. The electrode thus obtained comprises a catalytic layer containing oxides of tin, ruthenium, iridium and titanium applied to a substrate of a valve metal.

9 Claims, 1 Drawing Sheet

(51) Int. Cl.
  *C23C 18/12* (2006.01)
  *C25B 1/26* (2006.01)
  *C25B 9/23* (2021.01)
  *C25B 11/063* (2021.01)
  *C25B 13/00* (2006.01)

(52) U.S. Cl.
  CPC .............. *C25B 9/23* (2021.01); *C25B 11/063* (2021.01); *C25B 13/00* (2013.01)

(58) Field of Classification Search
  USPC ................................................ 427/226, 115
  See application file for complete search history.

(56) References Cited

U.S. PATENT DOCUMENTS

| | | | | |
|---|---|---|---|---|
| 4,003,817 A * | 1/1977 | Bianchi | ................... | C25B 11/04 204/290.03 |
| 4,213,843 A * | 7/1980 | Sato | ...................... | C25B 11/093 204/290.13 |
| 4,471,006 A * | 9/1984 | Asano | .................. | C25B 11/091 427/126.3 |
| 4,626,334 A * | 12/1986 | Ohe | ...................... | C25B 11/093 204/290.14 |
| 5,230,780 A * | 7/1993 | Carlson | ................ | C25B 11/093 205/532 |
| 6,527,939 B1 * | 3/2003 | Hardee | ..................... | C25C 7/02 205/292 |
| 7,258,778 B2 * | 8/2007 | Hardee | ..................... | C25B 11/093 204/290.01 |
| 9,677,183 B2 * | 6/2017 | Kintrup | ..................... | C25B 1/26 |
| 10,513,787 B2 * | 12/2019 | Haneda | ..................... | C25B 1/26 |
| 11,634,827 B2 * | 4/2023 | Urgeghe | ............... | C25B 11/093 204/290.1 |
| 2004/0188247 A1 * | 9/2004 | Hardee | .................. | C25B 11/093 204/290.14 |
| 2011/0209992 A1 * | 9/2011 | Urgeghe | ............... | C25B 11/093 204/263 |
| 2012/0103828 A1 * | 5/2012 | Bulan | .................. | C25B 11/093 205/625 |
| 2013/0087461 A1 * | 4/2013 | Kintrup | ............... | H01M 4/9075 502/325 |
| 2013/0186750 A1 * | 7/2013 | Urgeghe | ............... | C25B 11/093 204/290.12 |
| 2014/0224667 A1 * | 8/2014 | Kintrup | ..................... | C25B 1/34 204/290.13 |
| 2014/0231249 A1 * | 8/2014 | Morimitsu | ............ | C25B 11/093 204/290.12 |
| 2014/0322631 A1 * | 10/2014 | Klose-Schubert | ........................... | H01M 8/04228 502/325 |
| 2017/0198403 A1 * | 7/2017 | Bonometti | ............ | C25B 11/093 |
| 2017/0306512 A1 * | 10/2017 | Gargiulo | ............... | C25B 11/093 |
| 2018/0127887 A1 * | 5/2018 | Calderara | .............. | C25B 11/093 |
| 2021/0130966 A1 * | 5/2021 | Griffis | ................... | C02F 1/4674 |

OTHER PUBLICATIONS

International Search Report and Written Opinion for Corresponding International Application No. PCT/EP2019/065538 (Sep. 16, 2019) (11 Pages).

International Preliminary Report on Patentability for Corresponding International Application No. PCT/EP2019/065538 (Sep. 25, 2020) (5 Pages).

* cited by examiner

ANODE FOR ELECTROLYTIC EVOLUTION OF CHLORINE

This application is a U.S. national stage of PCT/EP2019/065538 filed on Jun. 13, 2019 which claims the benefit of priority from Italian Patent Application No. 102018000006544 filed Jun. 21, 2018 the contents of each of which are incorporated herein by reference.

FIELD OF THE INVENTION

The invention relates to a process for obtaining an electrode usable as an anode in electrolytic cells for the production of chlorine. The electrode thus obtained comprises a catalytic layer containing oxides of tin, ruthenium, iridium and titanium applied to a substrate of a valve metal.

PRIOR ART

The field of the invention relates to the preparation of a catalytic coating for electrodes used in processes of electrolysis of brines of alkali chlorides, said coating is applied to an electrically conductive substrate, typically titanium, titanium alloy or other valve metal.

The processes of electrolysis of brines of alkali chlorides, for example of brine of sodium chloride for the production of chlorine and caustic soda, are often carried out with anodes based on titanium or other valve metal activated with a surface layer of ruthenium dioxide ($RuO_2$) that has the property of lowering the overvoltage of the anodic reaction of evolution of chlorine.

A partial improvement in terms of chlorine overvoltage and therefore of process voltage and total energy consumption is obtainable by adding, to a formulation based on $RuO_2$ mixed with $SnO_2$, a certain amount of a second noble metal selected from iridium and platinum, for example as described in EP0153586; however, this and other formulations containing tin such as the formulation described in U.S. Pat. No. 4,513,102 have the problem of simultaneously also lowering the overvoltage of the competing reaction of evolution of oxygen, and chlorine produced by the anodic reaction with an excessive amount of oxygen.

A further partial improvement of performance is obtainable by applying, on a metallic substrate, a formulation based on $RuO_2$ and $SnO_2$ with addition of small amounts of $IrO_2$ for example as described in WO2016083319. A similar formulation makes it possible to obtain optimum values of cell potential and moderate amounts of oxygen. However, this last-mentioned formulation and the other formulations mentioned above do not endow the electrode with optimum resistance to the current reversals that inevitably occur in case of malfunction of industrial plant.

US 2013/186750 A1 describes an electrode for chlorine evolution consisting of a metal substrate coated with alternate layers of two distinct compositions, namely a layer comprising oxides of iridium, ruthenium and valve metals, for instance tantalum, and a layer comprising oxides of iridium, ruthenium and tin.

In Chellamall et al. "*Anodic incineration of phthalic anhydride using $RuO_2$-$IrO_2$-$SnO_2$-$TiO_2$ coated on Ti anode*", Arabian Journal of Chemistry (2012), Vol. 9, Supplement 2, November 2016, Pages S1690-S1699, an anode for the electrochemical oxidation of phthalic anhydride is described consisting of a titanium substrate coated with mixed metal oxides of $RuO_2$, $IrO_2$, $SnO_2$ and $TiO_2$ prepared by a thermal decomposition method.

Moreover, the coatings of the prior art, for example such as the formulation described in JPS6338592 based on oxides of tin and noble metals, are generally prepared starting from tetravalent tin precursors, in particular tin tetrachloride ($SnCl_4$), mixed with corresponding precursors of the noble metal in aqueous solution. However, the extreme volatility of the precursors thus obtained makes them unfavourable for application in industrial processes.

It is therefore clear that there is a need for a new catalytic coating for electrodes for evolution of gaseous products in electrolytic cells in processes of electrolysis of brines of alkali chlorides, characterized by higher catalytic activity and higher resistance to current reversals in the usual operating conditions, relative to the formulations of the prior art.

SUMMARY OF THE INVENTION

Various aspects of the present invention are presented in the appended claims.

The present invention consists of the application of a formulation based on $RuO_2$, $IrO_2$, $SnO_2$ and $TiO_2$ on a metallic substrate; a formulation thus obtained leads to an appreciable improvement of the resistance of the electrode in situations of current reversal and moreover makes it possible to increase the selectivity of the reaction of production of $Cl_2/O_2$ in favour of the first.

In one aspect, the invention relates to an electrode for gas evolution in electrolytic processes comprising a valve metal substrate and a catalytic coating containing 5-40% of tin, 3.6-15% of iridium, 18-40% of ruthenium and 30-70% of titanium, in the form of metals or their oxides in molar percentage referred to the elements, said catalytic coating being obtained by thermal decomposition of an acetic solution containing hydroxyacetochloride complexes of iridium, ruthenium, tin and titanium.

The inventors observed that the presence of tin and titanium in the form of metal or their oxides in a catalytic layer containing ruthenium and iridium oxides, applied starting from an acetic solution containing the hydroxyacetochloride complex of these components at the concentrations indicated above, leads to an appreciable increase in the resistance of the final electrode in situations of current reversal comparable to that obtainable in the presence of Ti alone.

It was also observed that the present formulation, obtained from precursors containing hydroxyacetochloride complexes, gives optimum values of cell potential.

In one embodiment, the invention relates to an electrode having a catalytic coating that comprises a mixture containing 6-30% of tin, 3.7-12% of iridium, 20-30% of ruthenium and 50-70% of titanium, in the form of metals or their oxides.

The inventors observed that an electrode with a similar catalytic coating, containing substantial amounts of valve metal, makes it possible to obtain moderate concentrations of oxygen, thus improving the selectivity of the reaction of production of $Cl_2/O_2$ in favour of the first.

In a further embodiment, the invention relates to an electrode in which the catalytic coating comprises a mixture containing 8-18% of tin, 4-10% of iridium, 18-36% of ruthenium and 45-65% of titanium, in the form of metals or their oxides.

This last-mentioned embodiment has the advantage of increasing the service life of the electrode while maintaining optimum selectivity with respect to the reactions of evolution of chlorine and oxygen.

In a further aspect, the invention relates to an electrode for gas evolution in electrolytic processes comprising a valve metal substrate provided with a catalytic coating comprising a mixture containing tin, iridium, ruthenium and titanium, in the form of metals or their oxides, in which the Ru:Ir molar ratio is between 1.5 and 8 and the Ti:Sn molar ratio is between 1 and 6 and the molar ratio of the amount of valve metals to the amount of noble metals is between 1.2 and 5, wherein said catalytic coating consists of thermally decomposed layers of an acetic solution containing the hydroxyacetochloride complexes of the aforementioned metals.

The inventors observed that an electrode with a similar catalytic coating, having said range of ratios of the amount of noble metals to the amount of valve metals, makes it possible to obtain high performance in terms of resistance to current reversals yet maintaining good catalytic activity for the evolution of chlorine and good selectivity of the reaction of production of $Cl_2/O_2$ in favour of the first.

In a further embodiment the catalytic coating has a specific noble metal loading expressed as the sum of iridium and ruthenium of 6 to 12 $g/m^2$ and the preferred valve metal substrate is titanium or titanium alloy.

In a further aspect, the present invention relates to an electrode comprising a valve metal substrate and a catalytic coating in which said catalytic coating is obtained by thermal decomposition of an acetic solution containing hydroxyacetochloride complexes of iridium, ruthenium, tin and titanium, said solution containing 5-40% of tin, 3.6% of iridium, 18-40% of ruthenium and 30-70% of titanium, in molar percentage referred to the elements.

In a further aspect, the present invention relates to a process for obtaining an electrode for evolution of gaseous products in electrolytic cells, for example for evolution of chlorine in cells for electrolysis of alkali brines, comprising the following steps:
 a) application of an acetic solution containing hydroxyacetochloride complexes of iridium, ruthenium, tin and titanium on a valve metal substrate, subsequent drying at 50-60° C. and thermal decomposition at 450-600° C. for a time of 5 to 30 minutes until reaching a specific noble metal loading expressed as the sum of iridium and ruthenium of 0.4 to 1 $g/m^2$;
 b) repetition of step a) until a catalytic coating is obtained with a specific noble metal loading of 6 to 12 $g/m^2$;
 c) heat treatment at 450-600° C. for a time of 50 to 200 minutes.

According to one embodiment of the process as above, said acetic solution contains 5-40% of tin, 3.6-15% of iridium, 18-40% of ruthenium and 30-70% of titanium, preferably 6-30% of tin, 3.7-12% of iridium, 20-30% of ruthenium and 50-70% of titanium, more preferably 8-18% of tin, 4-10% of iridium, 18-36% of ruthenium and 45-65% of titanium, in molar percentage referred to the elements.

In a further embodiment, the present invention relates to a process for the production of an electrode for gas evolution in electrolytic processes comprising the following steps:
 a) application on a valve metal substrate, of an acetic solution containing hydroxyacetochloride complexes of iridium, ruthenium, tin and titanium containing 5-40% of tin, 3.6-15% of iridium, 18-40% of ruthenium and 30-70% of titanium, in molar percentage referred to the elements; subsequent drying at 50-60° C. and thermal decomposition at 450-600° C. for a time of 5 to 30 minutes until reaching a specific noble metal loading expressed as the sum of iridium and ruthenium of 0.4 to 1 $g/m^2$;
 b) repetition of step a) until a catalytic coating is obtained with a specific noble metal loading of 6 to 12 $g/m^2$;
 c) final heat treatment at 450-600° C. for a time of 50 to 200 minutes.

Said acidic solution contains 6-30% of tin, 3.7-12% of iridium, 20-30% of ruthenium and 50-70% of titanium and preferably 8-18% of tin, 4-10% of iridium, 18-36% of ruthenium and 45-65% of titanium, in molar percentage referred to the elements.

The use of precursors comprising a hydroxyacetochloride complex of tin together with hydroxyacetochloride complexes of iridium, ruthenium and titanium makes it possible to overcome the limitations of the prior art, by supplying an anodic catalytic coating with a well-controlled chemical composition. The main criticality of the prior art is due to the high volatility of tin tetrachloride, which causes uncontrolled losses of the latter during the various heat treatments necessary for depositing the catalytic layer.

In one embodiment the temperature of thermal decomposition in steps a) and c) is between 48° and 550° C.

In a further aspect, the invention relates to a cell for electrolysis of alkali chloride solutions comprising an anodic compartment and a cathodic compartment wherein the anodic compartment is equipped with the electrode in one of the forms as described above, used as the anode for evolution of chlorine.

In a further aspect, the invention relates to an industrial electrolyser for the production of chlorine and alkali starting from alkali chloride solutions, even if free from protective polarization devices and comprising a modular arrangement of electrolytic cells with the anodic and cathodic compartments separated by ion-exchange membranes or by diaphragms, wherein the anodic compartment comprises an electrode in one of the forms as described above used as the anode.

The invention will now be described in more detail in connection with the following examples and the enclosed figures.

EXAMPLES

Figure 1:
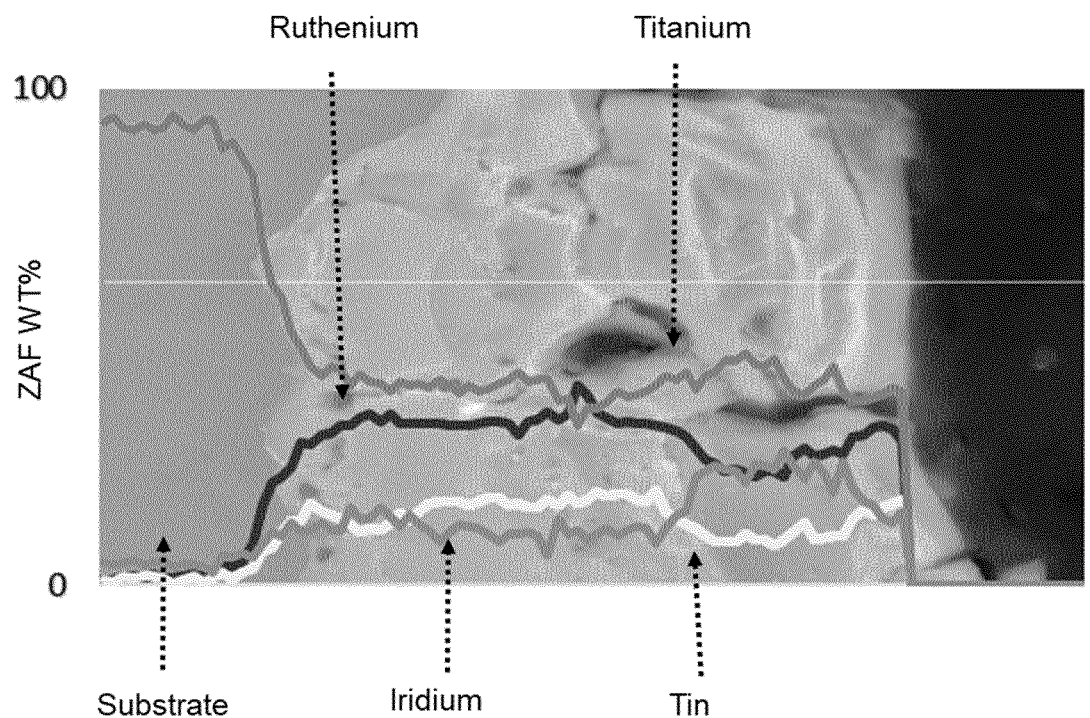
FIG. 1 is the Scanning Electron Microscope image of a cross-section of the electrode described in Example #1.

The following examples are included to demonstrate particular embodiments of the invention, whose feasibility has been amply verified in the range of values claimed. It will be obvious to a person skilled in the art that the compositions and the techniques described in the examples given hereunder represent compositions and techniques for which the inventors have found good operation of the invention in practice; however, a person skilled in the art will also appreciate that in the light of the present description, various changes may be made to the various embodiments described, still giving rise to identical or similar results while remaining within the scope of the invention.

Example 1

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 20% Ru, 7% Ir, 17% Sn and 56% Ti. The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 8 g/m$^2$. A final heat treatment is then carried out at 500° C. for 100 minutes.

The electrode thus obtained was identified as sample #1.

Example 2

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 30% Ru, 4% Ir, 15% Sn and 51% Ti.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 8 g/m$^2$. A final heat treatment is then carried out at 500° C. for 100 minutes.

The electrode thus obtained was identified as sample #2.

Example 3

A piece of titanium mesh with dimensions of 10 cm×10 cm was washed three times in deionized water at 60° C., changing the liquid each time, Washing was following by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 23% Ru, 12% Ir, 19% Sn and 46% Ti. The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 8 g/m$^2$. A final heat treatment is then carried out at 500° C. for 100 minutes.

The electrode thus obtained was identified as sample #3.

Example 4

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 20% Ru, 10% Ir, 16% Sn and 54% Ti. The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 12 g/m$^2$. A final heat treatment is then carried out at 500° C. for 100 minutes.

The electrode thus obtained was identified as sample #4.

Example 5

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 21% Ru, 7% Ir, 32% Sn and 40% Ti.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 9 g/m$^2$. A final heat treatment is then carried out at 500° C. for 100 minutes.

The electrode thus obtained was identified as sample #5.

Example 6

A piece of titanium mesh with dimensions of 10 cm×10 cm was washed three times in deionized water at 60° C., changing the liquid each time, Washing was following by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium, hydroxyacetochloride complex of iridium, and hydroxyacetochloride complex of titanium and having a molar composition equal to 21% Ru, 9% Ir, 29% Sn and 41% Ti.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 9 g/m². A final heat treatment is then carried out at 500° C. for 100 minutes.

The electrode thus obtained was identified as sample #6.

Counter-Example 1

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

Then 100 ml of an aqueous-alcoholic solution was prepared containing $RuCl_3 \cdot 3H_2O$, $H_2IrCl_6 \cdot 6H_2O$, $TiCl_3$ in an isopropanol solution, having a molar composition equal to 27% Ru, 12% Ir, 61% Ti.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 13 g/m². A final heat treatment is then carried out at 500° C. for 100 minutes.

The electrode thus obtained was identified as sample #1C.

Counter-Example 2

A piece of titanium mesh with dimensions of 10 cm×10 cm was washed three times in deionized water at 60° C., changing the liquid each time. Washing was followed by heat treatment for 2 hours at 350° C. The mesh was then treated in a 20% solution of HCl, with boiling for 30 minutes.

Then 100 ml of an aqueous-alcoholic solution was prepared containing $RuCl_3 \cdot 3H_2O$, $H_2IrCl_6 \cdot 6H_2O$, $TiCl_3$, $SnCl_4$ in an isopropanol solution, having a molar composition equal to 20% Ru, 7% Ir, 17% Sn and 56% Ti.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 8 g/m². A final heat treatment is then carried out at 500° C. for 100 minutes.

The electrode thus obtained was identified as sample #2C.

Counter-Example 3

A piece of titanium mesh with dimensions of 10 cm×10 cm was washed three times in deionized water at 60° C., changing the liquid each time, Washing was following by heat treatment for 2 hours at 350° C. The mesh was then treated in a 20% solution of HCl, with boiling for 30 minutes.

100 ml of an acetic solution was then prepared containing hydroxyacetochloride complex of tin, together with hydroxyacetochloride complex of ruthenium and hydroxyacetochloride complex of iridium and having a molar composition equal to 35% Ru, 6% Ir, 59% Sn.

The solution was applied on the piece of titanium mesh by brushing, in 14 coats. After each coat, drying was carried out at 50-60° C. for about 10 minutes, followed by heat treatment for 10 minutes at 500° C. The piece was air-cooled each time before applying the next coat.

The procedure is repeated until we reach a total loading of noble metal, expressed as the sum of Ir and Ru referred to the metals, equal to 8 g/m². A final heat treatment is then carried out at 500° C. for 100 minutes.

The electrode thus obtained was identified as sample #3C.

Sample Characterization

Evidence of the high volatility of tin tetrachloride and the related uncontrolled loss of the latter during the heat treatment has been confirmed by SEM EDX analysis of two samples of the electrode of Example 1 (sample 1) and the electrode of Counter-Example 2 (sample 2C), respectively.

The analyses were performed with a scanning electrode microscope (the commercial SEM/FEG Inspect F 50 by FEI with EDAX microanalysis system), equipped with a Everhart-Thornley detection system used in backscattering mode; the working distance was set at 10 mm, the acceleration voltage at 20 kV, and the magnification ranged between 10000× and 100000×.

Figure 2:
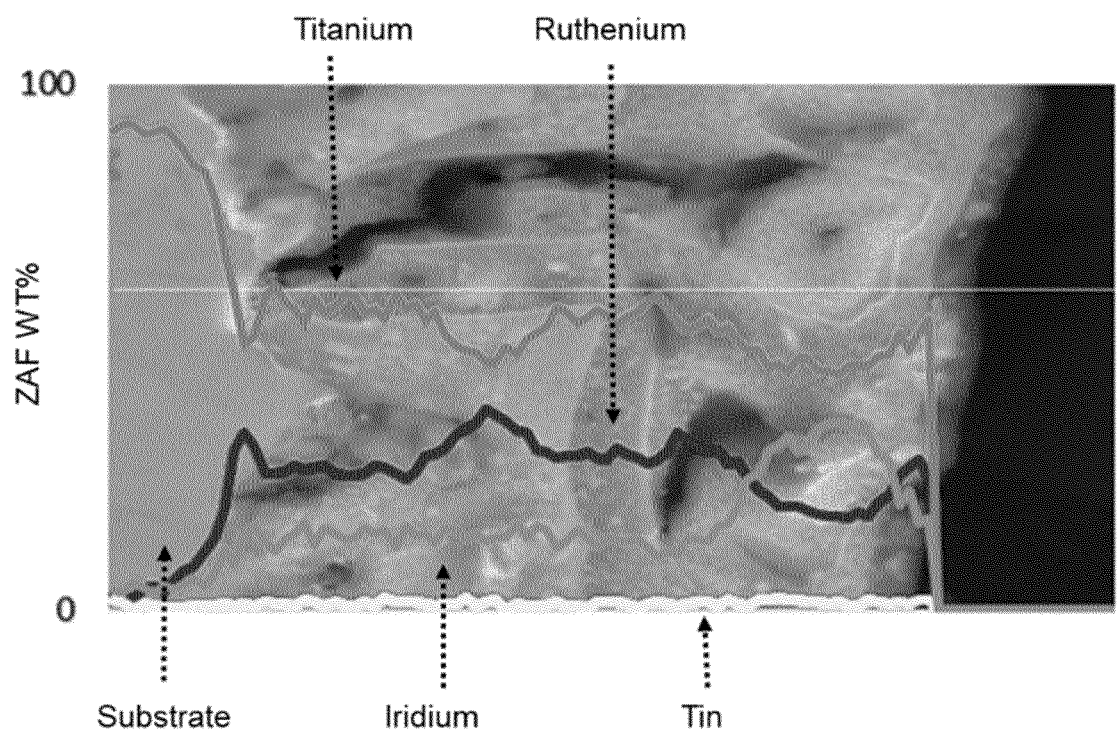
FIG. 2 is the Scanning Electron Microscope image of a cross-section of the electrode described in Counter-example #2C.

FIGS. 1 and 2 show images of cross sections of the catalytic coatings of the prepared electrodes of Example 1 and Counter-Example 2, respectively, and corresponding composition profiles determined using the ZAF correction method ("ZAF" refers to the correction of matrix effects of the specimen; specifically: Z refers to the atomic number effect, A refers to X-ray absorption effect and F refers to X-ray fluorescence effect).

As can be taken from FIG. 1 relating to the electrode of Example 1 (sample 1), tin is present throughout the cross-section of the catalytic coating. In addition, the metal composition detected by EDX Analysis is comparable to the molar composition of the initial acetic solution containing hydroxyacetochloride complexes of tin, ruthenium, iridium, and titanium equal to 20% Ru, 7% Ir, 17% Sn and 56% Ti of sample 1.

As can be taken from FIG. 2 relating to the electrode of Counter-Example 2 (sample 2C), there is only exiguous presence of tin in the entire cross-section of the catalytic coating. The metal composition detected by EDX Analysis proves the loss of most of tin as compared to the molar composition of the initial aqueous-alcoholic solution containing tin, ruthenium, iridium, and titanium equal to 20% Ru, 7% Ir, 17% Sn and 56% Ti of sample 2C.

Chlorine Evolution Test

The samples from the examples were characterized as anodes for evolution of chlorine in a laboratory cell supplied with sodium chloride brine at a concentration of 200 g/l, closely controlling the pH to a value of 3.

Table 1 shows the chlorine overvoltage measured at a current density of 3 kA/m², the percentage of oxygen by volume in the chlorine produced and the resistance to reversals expressed as percentage of noble metal lost.

TABLE 1

| Samples | $\eta Cl_2$ (mV) | $O_2/Cl_2$ (vol %) | Resistance to reversals (%) |
|---|---|---|---|
| 1 | 30 | 0.2 | 3 |
| 2 | 40 | 0.2 | 2 |
| 3 | 30 | 0.3 | 3 |
| 4 | 40 | 0.2 | 3 |
| 5 | 30 | 0.3 | 3 |
| 6 | 30 | 0.3 | 3 |
| 1C | 50 | 0.4 | 4 |
| 2C | 50 | 0.4 | 8 |
| 3C | 40 | 0.3 | 7 |

The foregoing description is not intended to limit the invention, which may be used according to various embodiments but without deviating from the aims, its scope being defined unambiguously by the appended claims.

In the description and in the claims of the present application, the term "comprises" and "contains" and their variants such as "comprising" and "containing" are not intended to exclude the presence of other additional elements, components or process steps.

The discussion of documents, actions, materials, devices, articles and the like is included in this description solely for the purpose of supplying a context for the present invention. It is not suggested or represented that some or all of these arguments would form part of the prior art or would be general common knowledge in the field relevant to the present invention before the priority date of each claim of this application.

The invention claimed is:

1. A method for the production of an electrode comprising the following steps:
   a) applying to a valve metal substrate an acetic solution consisting of hydroxyacetochloride complexes of iridium, ruthenium, tin and titanium, subsequent drying at 50-60° C. and thermal decomposition at 450-600° C. for a time of 5 to 30 minutes until reaching a specific noble metal loading expressed as the sum of iridium and ruthenium between 0.4 and 1 g/m²; followed by
   b) repeating step a) until obtaining a catalytic coating with a specific noble metal loading of 6 to 12 g/m²; and thereafter
   c) heat treating at 450-600° C. for a time of 50 to 200 minutes.

2. The method according to claim 1, wherein said acetic solution contains 5-40% of tin, 3.6-15% of iridium, 18-40% of ruthenium and 30-70% of titanium, in molar percentage referred to the elements.

3. A method for the production of an electrode for gas evolution in electrolytic processes comprising the following steps:
   a) applying to a valve metal substrate an acetic solution consisting of hydroxyacetochloride complexes of iridium, ruthenium, tin and titanium complexes containing 5-40% of tin, 3.6-15% of iridium, 18-40% of ruthenium and 30-70% of titanium, in molar percentage referred to the elements; subsequent drying at 50-60° C. and thermal decomposition at 450-600° C. for a time of 5 to 30 minutes until reaching a specific noble metal loading expressed as the sum of iridium and ruthenium of 0.4 to 1 g/m²; followed by
   b) repeating step a) until obtaining a catalytic coating with a specific noble metal loading of 6 to 12 g/m²; and thereafter
   c) heat treating at 450-600° C. for a time of 50 to 200 minutes.

4. The method according to claim 3, wherein said acetic solution contains 6-30% of tin, 3.7-12% of iridium, 20-30% of ruthenium and 50-70% of titanium, in molar percentage referred to the elements.

5. The method according to claim 1, wherein the temperature of said thermal decomposition in step a) and heat treatment in step c) is between 48° and 550° C.

6. A method for the production of an electrode comprising the following steps:
   a) applying to a valve metal substrate an acetic solution consisting of hydroxyacetochloride complexes of iridium, ruthenium, tin and titanium, subsequent drying at 50-60° C. and thermal decomposition at 450-600° C. for a time of 5 to 30 minutes until reaching a specific noble metal loading expressed as the sum of iridium and ruthenium between 0.4 and 1 g/m²; followed by
   b) repeating step a) until obtaining a catalytic coating with a specific noble metal loading of 6 to 12 g/m²; and thereafter
   c) heat treating at 450-600° C. for a time of 50 to 200 minutes, thereby obtaining the electrode comprising the valve metal substrate and the catalytic coating containing 5-40% of tin, 3.6-15% of iridium, 18-40% of ruthenium and 30-70% of titanium, in the form of metals or their oxides in molar percentage referred to the elements.

7. The method according to claim 1, wherein said acetic solution contains 6-30% of tin, 3.7-12% of iridium, 20-30% of ruthenium and 50-70% of titanium, in molar percentage referred to the elements.

8. The method according to claim 1, wherein said acetic solution contains 8-18% of tin, 4-10% of iridium, 18-36% of ruthenium and 45-65% of titanium, in molar percentage referred to the elements.

9. The method according to claim 3, wherein said acetic solution contains 8-18% of tin, 4-10% of iridium, 18-36% of ruthenium and 45-65% of titanium, in molar percentage referred to the elements.

* * * * *